United States Patent Office 3,258,025
Patented June 28, 1966

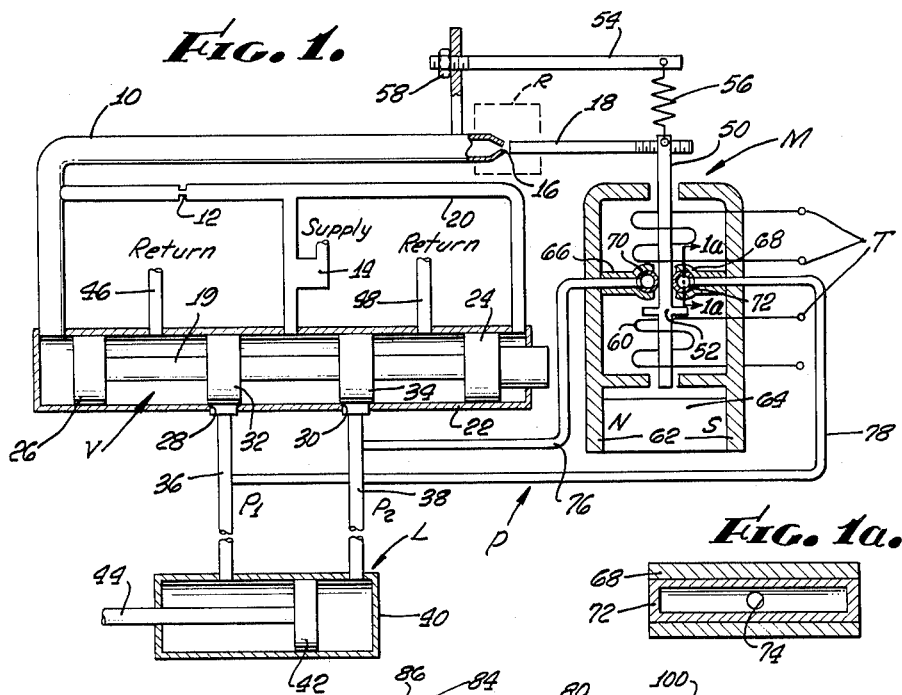
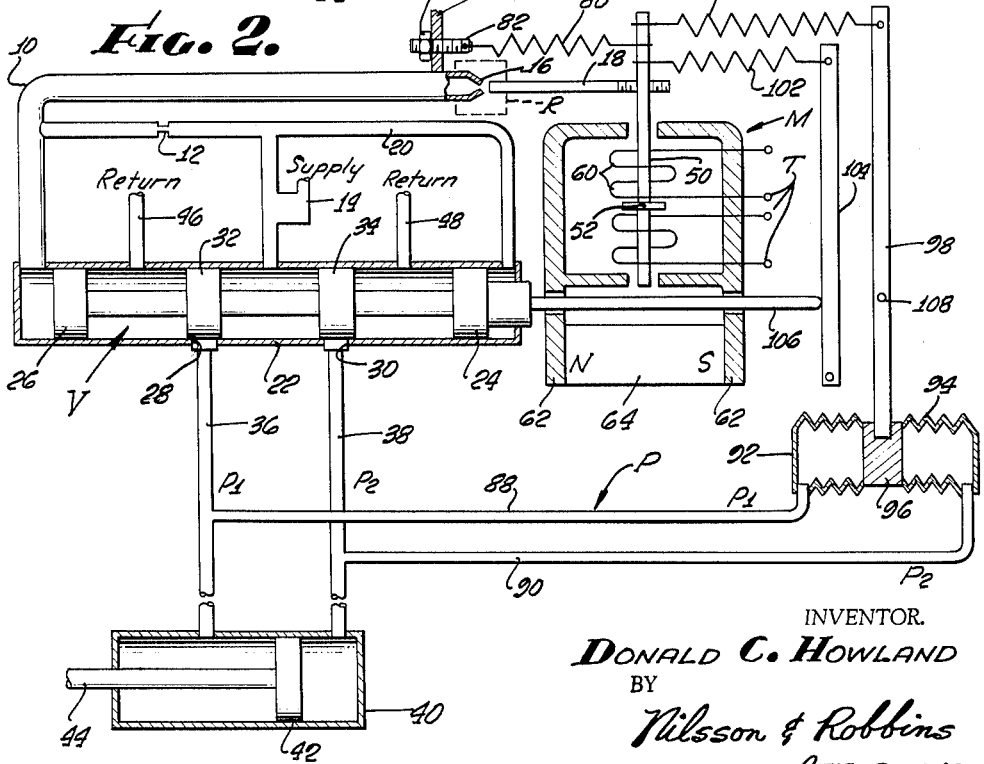

3,258,025
ELECTRO-HYDRAULIC CONTROL VALVE
Donald C. Howland, Costa Mesa, Calif., assignor, by mesne assignments, to Cadillac Gage Company, Warren, Mich., a corporation of Michigan
Filed Feb. 4, 1963, Ser. No. 255,796
3 Claims. (Cl. 137—85)

The present invention relates to electro-hydraulic valves, and particularly to a useful hydraulic servo valve which is responsive to electrical signals to control hydraulic fluid.

Considerable research and development has been done on various servo control valves of the type in which an electrical signal commands a hydraulic response. Hydraulic valves of this type, have been widely used in aircraft control units, missiles, and various other apparatus incorporating hydraulic systems. In general, the widely-divergent applications for these valves have resulted in many different and varied types. However, the need remains for a simple and effective pressure-control valve which may be economically manufactured, which is stable, compact and reliable in operation.

In general, the present invention provides an electro-hydraulic valve to control fluid movement under the command of an electrical signal. The apparatus includes a movable member that may take the form of a spool valve, which receives opposing hydraulic forces and which controls fluid flow according to its position. An electrical device operating in conjunction with a flow-restricting means then controls the differential between the opposing hydraulic forces acting on the valve member. The pressure differential between the passages in which fluid is under control, is then sensed and translated into a force which is applied to the flow-restricting means to stabilizing the operation of the system. The application of the stabilizing force to the flow-restricting means may be accomplished by flexible tubes that are pressure distorted to exert opposing forces on the flow-restricting means. Furthermore, the system may also incorporate an additional feed back force on the flow-restricting means which is derived from the movable member and is indicative of the flow rate through the passages in which fluid is under control.

An object of the present invention is to provide an improved electro-hydraulic servo valve.

Another object of the present invention is to provide a stable electro-hydraulic valve which may be employed to linearize saturable curves that are indicative of operation.

Still another object of the present invention is to provide an improved electro-hydraulic valve incorporating pressure as a control factor, which valve may be economically manufactured, reliably used and neatly packaged.

These and other objects and advantages of the present invention will become apparent from a consideration of the accompanying drawing wherein:

FIG. 1 is a diagrammatic representation of a valve constructed in accordance with the present invention;

FIG. 1a is a vertical sectional view taken along line 1a—1a of FIG. 1; and

FIG. 2 is a diagrammatic representation of another valve constructed in accordance with the present invention.

Referring initially to FIG. 1, a load L in the form of a hydraulic ram, is controlled by the system in accordance with electrical command signals that are applied to the input terminals T of a torque motor M which functions in conjunction with a control valve V. The system incorporates pressure means P for sensing the pressure differential in the fluid passages under control, and applying a feedback force within the torque motor M to balance the force resulting from the applied electrical signals. In this manner, the system functions as a pressure-control valve, operating at the command of applied electrical signals.

Considering the system of FIG. 1 in greater detail, a cavity 10 is supplied with hydraulic fluid under pressure through an orifice 12 from a fluid supply indicated to be connected at a duct 14. The cavity 10 contains an opening or orifice 16, at the right, through which, fluid is discharged at a variable rate dependent upon the position of an arm 18 which restricts the flow from the orifice 16. Fluid discharged from the orifice 16 passes to a return chamber or sump, as indicated by the dashed line about the discharge space. Of course, this fluid may be simply discharged as waste in some systems, depending on the application.

As a result of the fluid discharge from the cavity 10, the pressure therein is normally substantially less than supply pressure. However, these two pressures are applied to a spool valve 19 to produce a balance which holds the spool valve in the desired position. Specifically, the pressure of the cavity 10 is applied to the left end of a cylinder 22, the right end of which receives supply pressure through a passage 20 connected to the duct 14. The spool valve 19 has a land 26 at its left end, the full circular face of which, is exposed to the applied pressure from the cavity 10. A land 24, at the right end of the spool valve 19 has an annular surface exposed to fluid at the supply pressure. The two opposing hydraulic pressures acting on the spool valve 19 are thus unequal however, compensation to produce a balance results from exposing a full surface of the land 26 to reduced spressure, while providing the smaller annular surface of the land 24 upon which the supply pressure acts.

Upon unbalance of the hydraulic forces applied to the spool valve 19, it moves to various positions to control the fluid flow through ports 28 and 30 in the cylinder 22. That is, when the spool valve 19 is centered, the port 28 is closed by a land 32 on the spool valve 19 while the port 30 is closed by a similar land 34.

The cavity between the lands 32 and 34 and the cylinder 22 is connected to receive fluid from the duct 14, to supply fluid to either the port 28 or the port 30 upon displacement of the valve V. In this manner, the ports 28 and 30 may supply fluid through either of the passages 36 and 38 respectively to the load L, comprising a cylinder 40 containing a hydraulic piston 42. A connecting rod 44, affixed to the piston 42, will conventionally be connected to a mechanical load.

In order to relieve one end of the cylinder 40, during movement of the piston 42, fluid flow is permitted out of the cylinder through the passages 36 and 38 and the ports 28 and 30 to the spaces between the lands 26 and 32 and between the lands 34 and 24. These spaces are connected through passages 46 and 48 respectively to a fluid sump or unpressurized return chamber.

Consider now the structure of the torque motor M to differently position the arm 18 and thereby variously restrict the flow of fluid from the orifice 16. The motor M contains an armature 50 mounted to pivot about a point 52, and having its upper end threadably connected to the arm 18. The upper end of the armature 50 is also connected to an arm 54 by a spring 56. The arm 54 is affixed, as by a nut 58 to a stable portion of the valve body, and in function, the spring 56 with the arm 54 act as the centering adjustment for the armature 50, variation being accomplished by repositioning the nut 58.

The armature 50 has electro-magnetic coils 60 mounted thereon to magnetize it in either polarity sense so that magnetic fields from pole pieces 62 exert rotational forces on the armature 50. The pole pieces 62 are magnetized by a permanent magnet 64 affixed between the lower ends of the pole pieces. The pole pieces then extend to be adjacent the armature 50 at its upper and lower ends. Thus, magnetization of the armature 50 subjects it to magnetic fields which force it in either direction about the pivot point 52. Of course, the direction of the rotational force depends on the sense of the electrical current applied through the coils 60.

At a location above the pivot point 52 of the armature 50, a pair of opposing supports 66 and 68, are affixed to the pole pieces 62. The supports 66 and 68 are formed of non-magnetic material and terminate in semi-cylindrical horizontal elongate openings or slots, which house cylinders 70 and 72. The cylinders 70 may be formed of various flexible material, and in one embodiment beryllium copper has been found very satisfactory. These cylinders are closed at their ends as shown in FIG. 1a and they contain ports 74 through which they are pressurized. The cylinder 70 is connected through a passage 76 to the passage 38 while the cylinder 72 is connected through a passage 78 to the passage 36. Thus, the cylinders 70 and 72 are subjected to the pressures P1 and P2 employed to position the piston 42 in the cyinder 40.

Considering the operation of the system of FIG. 1, first, assume electrical signals are applied to the terminals T, causing the armature 50 to be moved in a counterclockwise direction about the pivot point 52 to carry the arm 18 away from the orifice 16 and permit an increased flow from the orifice 16. Upon such an occurrence, the pressure in the cavity 10 drops, because fluid cannot be supplied through the orifice 12 at a rate sufficient to maintain the initial fluid pressure. Reduction of the pressure in the cavity 10 results in a reduced force applied to the land 26 of the spool valve 19; therefore, forces on the valve are unbalanced, urging the valve to the left and displacing the land 32, so that the passage 36 is open to the source of supply fluid and displacing the land 34 to connect the passage 38 to the low-pressure return line 48.

As a result of these changes, the pressure P1 in the passage 36 increases while the pressure P2 in the passage 38 decreases. This pressure differential is applied to the load L to accomplish the desired change, and is also translated into a force on the armature 50 tending to oppose the assumed initial change to restore balance between the hydraulic forces acting on the spool valve 19. Specifically, the increased pressure P2 in the passage 36 is applied through the passage 38 to the cylinder 72 which distorts, expands or flexes outwardly, exerting a force on the armature 52 urging the armature to the left in opposition to the originally-assumed displacement. As a result, the flow through the orifice 16 is restricted to an increased extent, thereby balancing the hydraulic forces applied to the valve V. It is to be noted that as the cylinder 72 is confined about much of its surface, the distortion occurs primarily at the place of engagement with the armature.

The balancing feedback operation is facilitated by the reduced pressure P1 in the passage 36, which is applied to the cylinder 70, which flexes inwardly to a slight degree thereby accommodating the movement of the armature 50 to the left. In the system of FIG. 1, it is to be noted that the use of the small hydraulic-flex cylinders 70 and 72 results in an extremely compact system which is effective as a pressure-control valve.

A deviation opposed to that assumed above results in precisely the opposite feedback forces to balance the hydraulic forces and again stabilize the spool valve 19 to the desired position.

In some instances, pressure-flow valves are desired wherein control is effected by both pressure and flow considerations. A valve of this type incorporating the present invention is shown in FIG. 2 and will now be considered in detail.

Components of the system of FIG. 2 similar to those identified above with reference to FIG. 1 bear like identification numbers. The basic operation of the torque motor M in conjunction with the hydraulic system incorporating the valve V in the system of FIG. 2 is generally similar to that previously described. Therefore, an understanding of the structure and operation of the system of FIG. 2 may now best be provided by assuming certain initial conditions and explaining the resulting operation simultaneously with the introduction of elements not previously considered.

Assume initially that electrical signals are applied to the terminals T to produce currents through the coils 60 which magnetize the armature 50 to urge it in a clockwise direction, drawing the arm 18 away from the orifice 16. This force acts against a spring 80 affixed to a stud 82 which passes through a mounting bracket 84 on the valve body, to receive a nut 86. These elements serve as a centering adjustment for the armature 50 balancing the forces of other springs as described below.

As the armature 50 moves to the right allowing an increased flow from the orifice 16, the pressure in the chamber 10 decreases, resulting in an unbalance of the hydraulic forces applied respectively to the lands 24 and 26 of the spool valve 19. As a result of this unbalance, the spool valve 19 moves to the left opening the port 28 to fluid supply pressure from the duct 14, and opening the port 30 to the return line 48. Therefore, the port 26 supplies pressure fluid to the passage 36 increasing the pressure P1, while the port 30 relieves the passage 38 to reduce the pressure P2. As a result, the piston 42 is urged to the right as commanded by the applied electrical signals. However, to preserve control of the system, the pressure differential applied to the load is sensed to provide a feedback force. Specifically, the passages 36 and 38 are connected by ducts 88 and 90 to the interior of a pair of opposed bellows 92 and 94 respectively. The bellows 92 and 94 are mounted in opposed relationship to exert forces on a force transfer block 96 which is affixed to the lower end of a pivotally-mounted beam 98. The upper end of the beam 98 is connected to the upper end of the armature 50 by a spring 100.

Also affixed at the upper end of the armature 50 is a spring 102, the other end of which is connected to the upper end of a beam 104 that is pivotally mounted at its lower end and engaged by a slider 106 affixed to the right end of the valve V.

The differential in pressure in the passages 36 and 38 resulting from the initial assumption, is applied to the bellows 92 and 94, with the result that the bellows 92 expands while the bellows 94 contracts. As a result, the block 96 moves to the right below its pivot point 108 causing the upper end of the beam 98 to move to the left and resulting in the application of a force to the armature 50 which tends to move the armature in a counterclockwise direction. Therefore, the arm 18 is restored a position to restrict the flow through the orifice 16 to a greater extent, thereby balancing the opposing hydraulic forces applied to the value V.

In the system of FIG. 2, the stabilizing feedback is accomplished by the pressure differential as considered above and also in accordance with the displacement of the spool valve 19 which is a manifestation of flow rate. The spool valve 19, upon displacement to the left (as assumed for purposes of example) moves the slider 106 to the left, thereby permitting the spring biased beam 104 to move in a counterclockwise direction which results in movement of the armature 50 in a counterclockwise direction. Therefore, the system of FIG. 2 effects control in accordance with both flow and pressure, and by utilizing various combinations of these two factors, considerable flexibility can be obtained.

In the system of FIG. 2 it is to be understood that a command by electrical signals which results in the arm 18 restricting the flow from the orifice 16 to a greater extent, starts a series of events which results in feedback balancing forces to the armature precisely opposed to those described above.

In view of the systems described herein, it may be seen that an improved servo valve is provided to control fluid in a plurality of passages in accordance with electrical command signals, and employing feedback forces to accomplish stability.

An important feature of the present invention resides in the combination of the signal controlled fluid restricting means to accomplish differentials between a pair of opposing hydraulic forces to control the fluid in a plurality of passages, in combination with apparatus for sensing the pressure differential in the passages to apply a feedback force effective upon the flow-restricting means.

It should be noted that the particular embodiments of the invention described are fully capable of providing the advantages and achieving the objects set forth, such embodiments are merely illustrative, and this invention is not limited to the details of construction illustrated and described herein except as defined by the appended claims.

What is claimed is:

1. A stabilized hydraulic valve unit for regulating the fluid pressure differential between a pair of passages, in accordance with an applied electrical signal, comprising:
    a control valve member, including an element movable relative a neutral position to control the flow of fluid in at least one of said passages;
    means for applying opposed hydraulic forces to said element, each tending to move said element relative said neutral position;
    electromechanical means for controlling said opposed hydraulic forces in accordance with said signal, and including a mechanical control arm; and
    first and second resiliently deformable members of cylindrical configuration, said members being closed and each hydraulically connected to receive fluid pressure from one of said passages, said members further each being positioned to provide opposing exterior arcuate surfaces contiguous said mechanical control arm whereby to apply displacement forces to said control arm in accordance with the hydraulic pressure differential between said passages.

2. A hydraulic system according to claim 1 wherein said tubular member comprises beryllium copper, flexible to accomplish feedback control of said mechanical control arm.

3. A hydraulic valve system, for regulating fluid in at least a first and a second passage, in accordance with an electrical control signal comprising:
    a valve member, including an element movable relative a neutral position to thereby control the flow of fluid in at least one of said passages;
    means for applying opposed hydraulic forces to said element, each tending to move said element relative said neutral position;
    electromechanical means for controlling said opposed hydraulic forces in accordance with said electrical signal, and including a mechanical control arm; and
    at least first and second closed tubular, resiliently-deformable metal chambers affixed contiguous to said mechanical control arm in forced opposing relationship said first and second tubular members being hydraulically connected to said first and second passages whereby hydraulic pressures in said passages are introduced into said members to produce distortion of said deformable members to apply opposed forces to said mechanical control arm.

References Cited by the Examiner
UNITED STATES PATENTS

| | | | |
|---|---|---|---|
| 2,600,846 | 6/1952 | Casler | 92—90 X |
| 2,790,427 | 4/1957 | Carson | 137—85 X |
| 2,934,765 | 4/1960 | Carson | 137—625.61 |
| 2,962,002 | 11/1960 | Hayner | 137—85 X |
| 3,033,232 | 5/1962 | Bahniuk | 137—625.62 |

ISADOR WEIL, *Primary Examiner.*

WILLIAM F. O'DEA, *Examiner.*

A. COHAN, *Assistant Examiner.*